United States Patent [19]

Hayashida et al.

[11] Patent Number: 4,987,191

[45] Date of Patent: Jan. 22, 1991

[54] SILK-LIKE FILM

[75] Inventors: Haruo Hayashida; Kouji Kubo; Ryouichi Nomura; Satoru Koyama, all of Chiba, Japan

[73] Assignee: Sumitomo Chemical Co., Ltd., Osaka, Japan

[21] Appl. No.: 369,976

[22] Filed: Jun. 22, 1989

[30] Foreign Application Priority Data

Jun. 22, 1988 [JP] Japan ................. 63-155623

[51] Int. Cl.$^5$ .............. C08L 23/06; C08L 23/20; C08L 23/08; C08L 33/12
[52] U.S. Cl. .................................. 525/227
[58] Field of Search .............................. 525/227

[56] References Cited

U.S. PATENT DOCUMENTS

| | | | |
|---|---|---|---|
| 2,953,541 | 9/1960 | Pecha et al. | 525/227 |
| 3,248,359 | 4/1966 | Maloney | 525/227 |
| 3,663,663 | 5/1972 | McAda | 525/227 |
| 4,374,882 | 2/1983 | Harlan | 428/36 |
| 4,379,888 | 4/1983 | Yoshimura | 525/227 |

FOREIGN PATENT DOCUMENTS

| | | | |
|---|---|---|---|
| 231601 | 12/1959 | Australia | 525/227 |
| 244982 | 11/1987 | European Pat. Off. | 525/227 |
| 50-010838 | 2/1975 | Japan | 525/227 |
| 58-067736 | 4/1983 | Japan | 252/227 |
| 59-066437 | 4/1984 | Japan | 525/227 |
| 60-31508 | 2/1985 | Japan . | |
| 61-106645 | 5/1986 | Japan . | |
| 935603 | 8/1963 | United Kingdom | 525/227 |

*Primary Examiner*—Carman J. Seccuro
*Attorney, Agent, or Firm*—Sughrue, Mion, Zinn, Macpeak & Seas

[57] ABSTRACT

A silk-like polyethylene plastic film is disclosed, comprising an extrusion molded film of a mixture of (A) an ethylene/methacrylate copolymer having a methacrylate content of from 10 to 40 weight % and an MFR of from 0.5 to 40 g/10 min. with (B) polyethylene having an MFR of from 0.02 to 5.0 g/10 min., said mixture having amethacrylate content of from 7 to 25 weight % and an MFR ratio of the component (A) to the component (B) of from 0.05 to 120.

This silk-like film has no reflective gloss, opacity, soft and smooth touch, and which sounds low when it is crumpled. Thus it is preferably used as throwaway rainwears, medical sheets, etc.

5 Claims, No Drawings

SILK-LIKE FILM

FIELD OF THE INVENTION

The present invention relates to a silk-like polyethylene plastic film. More particularly, it relates to a silk-like polyethylene plastic film that is not glossy, opaque, and flexible. This plastic film is widely used as wrappings for sanitary goods, throwaway rainwears, etc.

BACKGROUND OF THE INVENTION

Ethylene plastics such as polyethylene and an ethylene/vinyl acetate copolymer can be easily formed by various methods. Especially, in the field of wrapping films, they have been used in great quantities, because of their chemical resistance, transparency, heat sealability, etc.

Recently the use of wrapping films has been diversified. Under these circumstances, there has been a growing demand for a film having specific properties reverse to inherent properties of polyethylene. There have been preferably used most of polyethylene films having surface smoothness, reflective gloss, good transparency, and relatively high stiffness. In the field of specific wrapping films such as a wrapping film for sanitary goods, and also in the field of specific goods such as throwaway rainwears and medical sheets, there has been a demand for a film having properties reverse to those of a conventional polyethylene film, namely, a film which has no reflective gloss, opacity, soft and smooth touch, and which sounds low when it is crumpled.

It has been said difficult to manufacture such a film as having the above specific properties using conventional processing technique or a polyethylene resin. There is known a silk-like polyethylene plastic film made of a mixture comprising an ethylene/vinyl acetate copolymer and polyethylene, for example, as disclosed in JP-A No. 61-106645 (The term "JP-A" as used herein means an "unexamined published Japanese patent application"). However, this published application has problems that when a film processing machine once stops and then starts, it takes a long time for a cleanup operation so that much resins will be discarded until good extruded products are obtained Further, it is substantially impossible to process said mixture because the ethylene/vinyl acetate copolymer is thermally decomposed at a processing temperature of 240° C. or more.

There are known formed products made of a mixture comprising polyethylene and a copolymer of ethylene and a vinyl ester (e.g., vinyl acetate); or a mixture comprising polyethylene and a copolymer of ethylene and an ester of an unsaturated carboxylic acid (e.g., methyl acrylate, ethyl acrylate), for example, as disclosed in JP-A No. 50-10838 and JP-B No. 40-24913 (the term "JP-B" as used herein means an "examined Japanese patent publication"). The object of these publications is to improve the stress cracking resistance and high-impact properties of the formed products, thus they are different from this invention in object.

SUMMARY OF THE INVENTION

An object of this invention is to provide efficiently a film which has good processability, no reflective gloss, opacity, soft and smooth touch, and which sounds low when it is crumpled.

The present inventors have attempted to overcome the above conventional problems and consequently found that the use of a mixture comprising specific ethylene/methacrylate copolymer and specific polyethylene as an extrusion resin efficiently provides a film which has no reflective gloss, opacity, soft and smooth touch, and which sounds low when it is crumpled.

Accordingly the present invention relates to a silk-like polyethylene plastic film comprising an extrusion molded film of a mixture of (A) an ethylene/methacrylate copolymer having a methacrylate content of from 10 to 40 weight % and a melt flow rate (MFR) of from 0.5 to 40 g/10 min. with (B) polyethylene having an MFR of from 0.02 to 5.0 g/10 min., said mixture having a methacrylate content of from 7 to 25 weight % and an MFR ratio of the component (A) to the component (B) of from 0.05 to 120.

The term "MFR" as used in this invention means a "melt flow rate" having symbols for units (g/10 minutes), measured according to JIS K7210, at a test temperature of 190° C. under a test load of 2.16 kgf.

DETAILED DESCRIPTION OF THE INVENTION

In this invention, the methacrylate means a compound represented by the following formula:

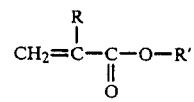

wherein R is methyl group, and R' is an alkyl group having from 1 to 4 carbon atoms.

Typical examples of the methacrylate include methyl methacrylate, ethyl methacrylate, and butyl methacrylate.

The mixture of a specific ethylene/methacrylate copolymer and specific polyethylene, which is used in this invention, is prepared by mixing (A) an ethylene/methacrylate copolymer having a methacrylate content of from 10 to 40 weight % and an MFR of from 0.5 to 40 g/10 min. with (B) polyethylene having an MFR of from 0.02 to 5.0 g/10 min. so that a methacrylate content be from 7 to 25 weight % and an MFR ratio of the component (A) to the component (B) be from 0.05 to 120.

The silk-like polyethylene plastic film of this invention can be efficiently obtained by extruding the resultant mixture.

The ethylene/methacrylate copolymer used as the component (A) includes an ethylene/methyl methacrylate copolymer, an ethylene/ethyl methacrylate copolymer and an ethylene/butyl methacrylate copolymer. These copolymers may be used singly or in combination. In these copolymers, the methacrylate content is from 10 to 40 weight %, preferably from 15 to 30 weight %, and the MFR is from 0.5 to 40 g/10 min., preferably from 1 to 20 g/10 min. If the methacrylate content of the copolymer is less than 10 weight %, a silk-like film cannot be obtained, while if the methacrylate content is more than 40 weight %, a large number of fish eyes or pinholes occur when the film is formed, thereby increasing the blocking tendency. If the MFR of the copolymer is less than 0.5 g/10 min., a silk-like film is not obtained, while if the MFR is more than 40 g/10 min., a large number of fish eyes or pinholes occur during formation of the film, whereby the blocking tendency increases.

The ethylene/methacrylate copolymer may be prepared by copolymerizing ethylene and a methacrylate in the presence of a free radical initiator such as an organic peroxide or oxygen, etc. Generally, the copolymerization reaction is conducted at a temperature of from 130° to 300° C. under a pressure of from 500 to 3000 kg/cm$^2$.

The polyethylene used as the component (B) of this invention includes those prepared by, for example, the following methods (1) As in the case of the ethylene/methacrylate copolymer, ethylene is polymerized using a free radical initiator. Generally, the polymerization reaction is conducted at a temperature of from 130° to 300° C. under a pressure of from 500 to 3000 kg/cm$^2$ to form a so-called low-density polyethylene from a high pressure radical polymerization process.

(2) Ethylene and an alpha-olefin having from 3 to 18 carbon atoms are polymerized using a transition metal catalyst. In general, the polymerization reaction is conducted in the presence or absence of a solvent at a temperature of from 30° to 300° C. under a pressure of from atmospheric pressure to 3000 kg/cm$^2$ and under gas-solid phases, liquid-solid phases, or a homogeneous liquid phase to form a so-called linear low-density polyethylene from an ionic polymerization process. These polyethylenes thus obtained may be used singly or in combination.

The polyethylene as the component (B) is one having an MFR of from 0.02 to 5.0 g/10 min., preferably from 0.1 to 3.0 g/10 min. and a density (measured according to JIS K7112) of from 0.850 to 0.945 g/cm$^3$, preferably from 0.916 to 0.945 g/cm$^3$, more preferably from 0.918 to 0.930 g/cm$^3$. If the MFR is out of the above range, a silk-like film is not obtained. Further, if the density is larger than the above range, a silk-like film is not obtained, too. Conversely, if the density is smaller than the range, the blocking tendency of the resultant film increases.

The component (A) and the component (B) are mixed so that a methacrylate content be from 7 to 25 weight %, preferably from 10 to 20 weight % and that an MFR ratio of the component (A) to the component (B) be from 0.05 to 120, preferably from 1 to 80, more preferably from 3 to 50. If the methacrylate content of the mixture is smaller than the above range, a silk-like film is not obtained, while if the content is larger than the range, a large number of fish eyes or pinholes occur during formation of the film, thereby increasing the blocking tendency.

Also, if the MFR ratio is smaller than the above range, a silk-like film is not obtained, while if the ratio is larger than the range, a large number of fish eyes or pinholes occur during formation of the film, thereby increasing the blocking tendency.

Uniform mixing is adopted to prepare the mixture of this invention. Examples of the mixing method include known methods such as a dry blending method using a mixing machine (e.g., a Henschel mixer or a tumbling mixer); a method comprising the steps of mixing, melting, and granulating using a single screw extruder, or a multiple screw extruder; and a method comprising the steps of melting, mixing, and granulating using a Banbury mixer, a kneading machine, or a roller mill.

If desired, various additives, for example, an antioxidant, a slipping agent, an antistatic agent an anti-blocking agent, and a colorant may be added to the mixture of this invention.

The mixture thus prepared is usually extruded into a film of from 0.02 to 0.25 mm thick using known machines such as blown film extrusion machines, or extruding machines equipped with T-die blade. The mixture of this invention may be either processed to form a single film or processed to form a laminated film using another thermoplastic resin composition. When the laminated film is formed, it is preferred that laminating be conducted so that the film of this invention can be positioned either on both outer sides of the laminated film or on one outer side of it.

The present invention is described in greater detail with reference to the following examples, although it is not limited thereto.

EXAMPLE 1

30 weight % of a low-density polyethylene from a high pressure radical polymerization process (density: 0.922 g/cm$^3$, MFR: 0.3 g/10 min.) and 70 weight % of an ethylene/methyl methacrylate copolymer (methyl methacrylate content: 25 weight %, MFR: 7.0 g/10 min.) were melt extruded to form a granular pellet by the use of a single screw extruder having a diameter of 65 mm under the conditions of temperature of 180° C. and rotating speed of 30 rpm. The resultant mixture had an MFR of 3.7 g/10 min. and a methyl methacrylate content of 18 weight %. Further, the mixture was extruded by the use of a blown film extrusion machine having a diameter of 50 mm under the conditions of resin temperature of 140° C, and blow-up ratio of 1.8. As a result, a blown film of 0.03 mm thick was obtained.

EXAMPLE 2

A blown film was produced in the same manner as in Example 1 except that the low-density polyethylene from a high pressure radical polymerization process, which was used in Example 1, was replaced with a linear low-density polyethylene from an ionic polymerization process (density: 0.919 g/cm$^3$, MFR: 0.8 g/10 min.). In this case, the mixture had an MFR of 4.2 g/10 min. and a methyl methacrylate content of 18 weight %.

COMPARATIVE EXAMPLE 1

A blown film was produced in the same manner as in Example 1 except that the ethylene/methyl methacrylate copolymer of Example 1 was replaced with an ethylene/vinyl acetate copolymer (vinyl acetate content 28 weight %, MFR: 7.0 g/10 min.). In this case, the mixture had an MFR of 3.7 g/10 min. and a vinyl acetate content of 20 weight %.

COMPARATIVE EXAMPLE 2

A blown film was produced in the same manner as in Example 1 except that only a low-density polyethylene from a high pressure radical polymerization process (density: 0.922 g/cm$^3$, MFR: 3.5 g/10 min.) was used.

COMPARATIVE EXAMPLE 3

A blown film was produced in the same manner as in Example 1 except that only an ethylene/methyl methacrylate copolymer (methyl methacrylate content: 25 weight %, MFR: 7.0 g/10 min.) was used.

The films as obtained in the above Examples and Comparative Examples were measured for physical properties.

The results are shown in Table 1.

The evaluation was carried out according to the following standards and method.

Reflectance: Measured according to JIS Z8741.
Haze: Measured according to ASTM D1003.
Blocking Strength: Measured according to ASTM D3354.
Young's Modulus: Measured according to ASTM D638.
Cleanup Time: Assuming that an extruder from which a good film is extruded stops working, and after a definite time (i.e., one hour) passes, the extruder begins to work again, "Cleanup Time" means a period of time between a time when the extruder begins to work again and a time when thermally oxidized crosslinking materials are completely discharged to obtain a good film again.

As mentioned above, according to this invention there is efficiently provided a silk-like polyethylene plastic film which has no reflective gloss, opacity, soft and smooth touch, and which sounds low when it is crumpled. Therefore, when sanitary goods, etc., are wrapped in the plastic film, the value of them is made high. Further, this plastic film is preferably used as throwaway rainwears, medical sheets, etc.

While the invention has been described in detail and with reference to specific embodiments thereof, it will be apparent to one skilled in the art that various changes and modifications can be made therein without departing from the spirit and scope thereof.

What is claimed is:

1. A silk-like polyethylene plastic film comprising an extrusion molded film of a mixture of (A) an ethylene/methacrylate copolymer having a methacrylate content of from 10 to 40 weight % and an MFR of from 0.5 to 40 g/10 min. with (B) polyethylene having an MFR of from 0.02 to 5.0 g/10 min. and a density of from 0.916 to 0.945 g/cm³, said mixture having a methacrylate content of from 7 to 25 weight % and an MFR ratio of the component (A) to the component (B) of from 3 to 50.

2. A film according to claim 1, wherein the ethylene/methacrylate copolymer (A) is an ethylene/methyl methacrylate copolymer.

3. A film according to claim 1, wherein the polyethylene (B) has a density of from 0.918 to 0.930 g/cm³.

4. A film according to claim 1, wherein the polyethylene (B) is a low-density polyethylene manufactured by radical polymerization under high pressure.

5. A film according to claim 1, wherein the polyethylene (B) is a linear low-density polyethylene manufactured by ionic polymerization.

TABLE 1

| Physical Properties | Example 1 | Example 2 | Comparative Example 1 | Comparative Example 2 | Comparative Example 3 |
| --- | --- | --- | --- | --- | --- |
| Reflectance (%) | 8 | 9 | 8 | 120 | 130 |
| Haze (%) | 77 | 74 | 76 | 4.2 | 3.0 |
| Blocking Strength (g/100 cm²) | 0 | 0 | 0 | 23 | 150 |
| Young's Modulus (kg/cm²) | | | | | |
| in longitudinal direction | 480 | 510 | 470 | 1900 | 600 |
| in transverse direction | 470 | 450 | 450 | 1800 | 570 |
| Sounds of a film when it is crumpled. | none | none | none | sound | a little |
| Touch | soft | soft | soft | hard | soft |
| Cleanup Time (min) | 8 | 7 | 42 | 6 | 10 |